United States Patent [19]
Farrell

[11] Patent Number: 4,632,652
[45] Date of Patent: Dec. 30, 1986

[54] DRAW-BACK VALVE ASSEMBLY FOR AN INJECTION MOLDING APPARATUS

[75] Inventor: John J. Farrell, Greenbrook, N.J.

[73] Assignee: Wedco Inc., Bloomsbury, N.J.

[21] Appl. No.: 727,683

[22] Filed: May 1, 1985

[51] Int. Cl.$^4$ ............................................. B29C 45/77
[52] U.S. Cl. .................... 425/137; 264/40.5; 264/328.13; 425/147; 425/149; 425/170; 425/555; 425/564
[58] Field of Search ............... 425/137, 146, 147, 149, 425/156, 157, 170, 159, 167, 555, 564, 557, 376 A; 264/40.5, 328.13, 513

[56] References Cited

U.S. PATENT DOCUMENTS

| Re. 28,721 | 2/1976 | Farrell | 425/159 |
| 3,667,884 | 6/1972 | Reinfeld | 425/149 |
| 4,473,215 | 9/1984 | Rathfon, II et al. | 425/149 |

Primary Examiner—Jay H. Woo
Assistant Examiner—Timothy W. Heitbrink
Attorney, Agent, or Firm—Sprung Horn Kramer & Woods

[57] ABSTRACT

An injection molding apparatus including a barrel for holding molten plastic material, a first passage connected at one end with the barrel for receiving hot plastic material from the barrel, a second passage connected with the other end of the first passage for receiving molten material from the first passage for supplying the material to a mold, a cylinder, a third passage connected at one end with the cylinder and connected at its other end with the second passage, a piston in the cylinder, movable by pressure means in one direction to maintain pressure on molten material in the cylinder, the third passage and the second passage, and movable by pressure means in the other direction to exert a suction action in the cylinder, the third passage and the second passage for drawing molten material in the second passage back into the third passage and the cylinder, and a valve means. In such injection molding apparatus means for maintaining the valve means between in three positions including a restricted flow position is provided.

In such injection molding apparatus means for controlling the pressure in the cylinder for at least one set point pressure is provided.

2 Claims, 6 Drawing Figures

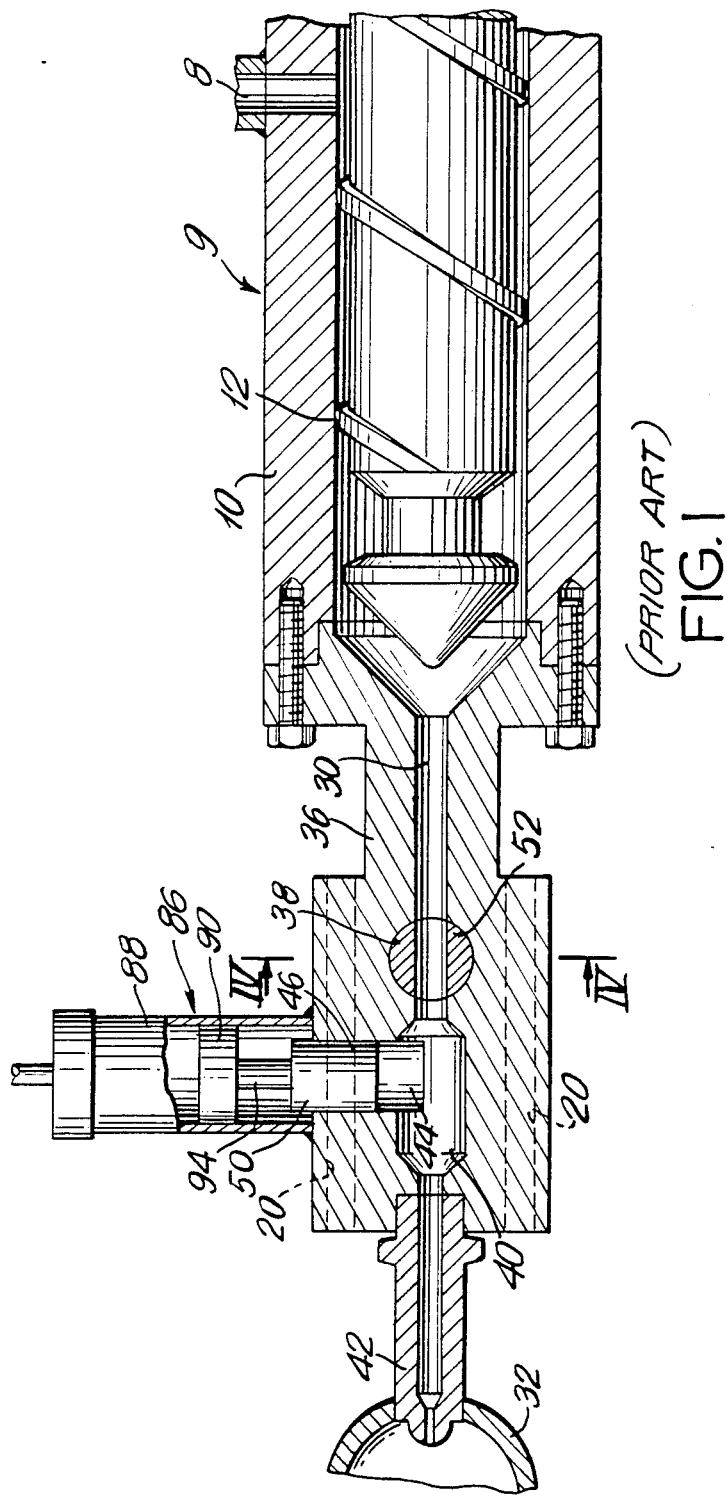
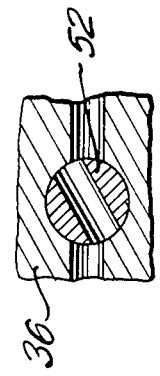
FIG.3
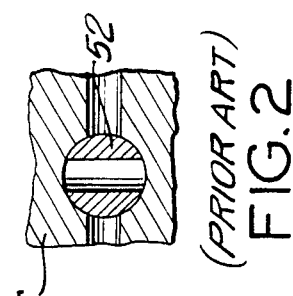
FIG.1 (PRIOR ART)
FIG.2 (PRIOR ART)

DRAW-BACK VALVE ASSEMBLY FOR AN INJECTION MOLDING APPARATUS

BACKGROUND OF THE INVENTION

The present invention relates to a draw-back valve assembly for an injection molding apparatus. More particularly, the present invention concerns a draw-back valve assembly for an injection molding apparatus wherein flow through the valve assembly is controlled. The present invention is also directed to a draw-back valve assembly for an injection molding apparatus wherein pressure spikes are eliminated.

In injection molding machines a helical screw in the plasticizer barrel is used as a ram to force thermoplastic material ahead of the screw into the mold. When the screw moves forward to its maximum injection position, it is necessary to maintain it in this position for a period of time which is called the "cure cycle". During the cure cycle, the screw maintains a pressure on the material to compensate for shrinkage of material which cools in the mold. Some additional material is forced into the mold to compensate for this shrinkage.

The mold area is cooled so that the part being molded becomes solidified. After the cure cycle has been completed, the reciprocating screw plasticizer begins to rotate and forces plastic toward the discharge end of the barrel. The screw continues to rotate until a predetermined amount of material is accumulated at the front of the screw for the next injection operation. The amount of material accumulated is controlled by a limit switch which stops the screw and moves the non-rotating screw back so as to create a suction in the passages leading to the mold. This draws the hot runner material away from the mold and the mold is then opened and the molded part removed.

The objection to the aforementioned method of operation is that the molded part cannot be removed from the mold until the next injection shot has been plasticized and accumulated ahead of the plasticizer screw. U.S. Pat. No. Re. 28,721 to the applicant herein, the entire contents of which are incorporated by reference herein, served to reduce the auxiliary of operation of an injection molding machine by making it possible to remove the molded article much sooner. In U.S. Pat. No. Re. 28,721, no drawback of the plasticizer screw is required and the preparation of the next injection charge can be prepared starting immediate after preparatory injection of the previous charge and without waiting for any part of the cure cycle to elapse.

In U.S. Pat. No. Re. 28,721, there was provided a valve between the mold and the discharge end of the plasticizer valve. An auxiliary cylinder and piston was used to maintain pressure on the material in the mold during the cure cycle and the piston in this auxiliary cylinder was reversed in direction to draw back the runner material prior to discharge of the molded part from the mold. Thus, U.S. Pat. No. Re. 28,721 made it possible to open the mold, remove the molded part, and close the mold preparator to the next operation while the plasticizer screw was plasticizing the next quantity of material for the molding of another part. U.S. Pat. No. Re. 28,721 served to greatly reduce the overall cycle of the apparatus.

Although U.S. Pat. No. Re. 28,721 represented a remarkable advancement in the field of injection molding, there remains a need to control the throughput of extruded material through the draw-back valve of U.S. Pat. No. Re. 28,721 so as to restrict flow to more slowly fill the mold. Furthermore, there remains a need to eliminate the pressure spikes inherent in the use of the draw-back valve assembly of U.S. Pat. No. Re. 28,721.

SUMMARY OF THE INVENTION

One object of the present invention is to control, such as to restrict, the flow of extruded material through a draw-back valve assembly of an injection molding machine so as to allow for a slower filling of the mold.

Another object of the present invention is to eliminate pressure spikes in a draw-back valve assembly of an injection molding machine.

The present invention concerns an injection molding apparatus. The apparatus includes a barrel for holding molten plastic material, a first passage connected at one end with the barrel for receiving hot plastic material from the barrel, a second passage connected with the other end of the first passage for receiving molten material from the first passage for supplying the material to a mold, a cylinder, a third passage connected at one end with the cylinder and connected at its other end with the second passage, a piston in the cylinder, movable by pressure means in one direction to maintain pressure on molten material in the cylinder, the third passage and the second passage, and movable by pressure means in the other direction to exert a suction action in the cylinder, the third passage and the second passage, for drawing molten material in the second passage back into the third passage and the cylinder, and a valve means. The valve means includes a housing, a valve chamber and a valve means. The first, second and third passages open into a valve chamber in the valve means. The valve means includes an element in the valve chamber which is movable. The element has a conduit therethrough. The element is located between the first and second passages.

In the present invention, a means is provided in the above-described injection molding apparatus for maintaining the valve means between the first position and the second position so as to restrict flow through the valve means and allow for a slower filling of the mold.

The present invention also concerns a means for controlling the pressure in the cylinder of the above described injection molding apparatus for at least one set point pressure.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 1 is a elevational view in cross-section depicting an injection molding apparatus with the valve element in its full open or first position.

FIG. 2 is a fragmentary elevational view in cross-section of the valve housing and valve element of FIG. 1, with the valve element in its closed or second position.

FIG. 3 is a fragmentary elevational view in cross-section of the valve housing and valve element of FIG. 2, with the valve element maintained in a position between the first position and the second position in accordance with the present invention.

DETAILED DESCRIPTION OF THE INVENTION

Figure 4:
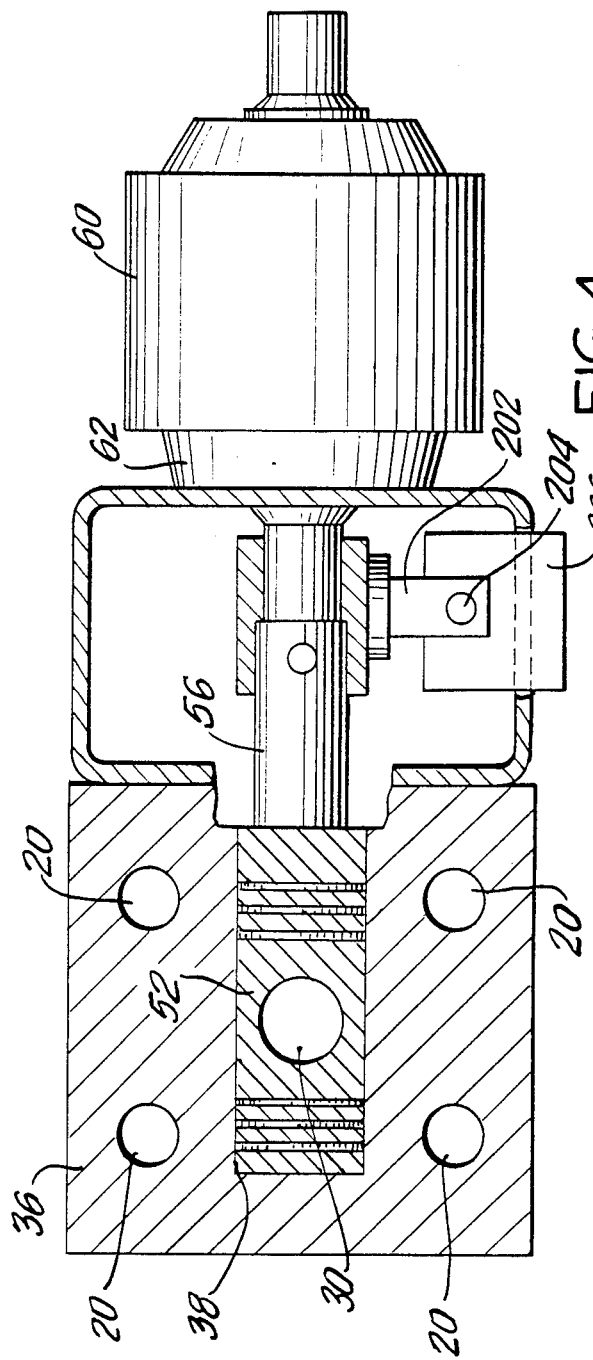
FIG. 4 is an elevational view in cross-section taken along line IV—IV in FIG. 1.

In the figures, wherein like numerals indicate like parts, there is shown in FIG. 1 an injection molding apparatus 9 which includes a plasticizer barrel 10 containing a helically threaded plasticizer screw 12 which is rotated in the barrel 10 by a rotation drive (not shown). Hot plastic enters barrel 10 via conduit 8.

The screw 12 is also movable longitudinally in the barrel 10 and this movement may be imparted to it by a rotation drive, i.e., motor, (not shown) connected to a piston (not shown) which in turn is rigidly secured to screw 12 beyond the screw threads. The screw 12 has limited longitudinal movement, the amount of movement depending upon the size of the charge to be injected into the mold. The rotation drive is constructed to permit longitudinal movement of the screw 12 within the necessary limits.

At the left end of the plasticizer barrel 10 there is a passage 30 through which material is discharged from the screw 12 to other passages leading to a mold 32.

When the screw 12 is rotated and no material can discharge from the passage 30, the forcing of material against the lower end of the plasticizer barrel 10 causes the screw 12 to be forced back and this provides for movement of the screw 12 in an axial direction away from the passage 30. In some injection molding apparatus, this movement of the screw 12 away from the passage 30 compresses a spring, and when it becomes possible for material to flow from the barrel 10 through the passage 30 to a mold 32, the spring moves the screw 12 axially. A motor (not shown) is used to control the time that pressure is exerted to move the screw 12 toward the passage 30 for an injection operation.

The passage 30 is located in a housing 36 containing a valve chamber 38 with which the passage 30 communicates. There is a second passage 40 in the housing 36 leading from the valve chamber 38 downward toward the mold. At the lower end of the second passage 40 there is a restricted passage nozzle 42 which may be considered as part of the runner of the mold 32.

A cylindrical heater 20 is disposed around passage 40.

In addition to the first passage 30 and the second passage 40, the housing has another passage 44 leading to a cylinder 46. In the construction illustrated, the cylinder 46 is of approximately the same diameter as the passage 44 and is merely a continuation of the passage. A piston 50 reciprocates back and forth in the cylinder 46.

There is a valve element 52 in the valve chamber 38. The valve chamber 38 is of circular cross-section and the valve element 52 fits into the valve chamber with running clearance in accordance with conventional two-way valve construction. The valve element 52 has a stem (not shown) extending through the end of the valve chamber 38 and has a handle (not shown) outside of the housing 36 and by which the valve element 52 can be moved into different positions.

The position of the valve element 52 shown in FIG. 1 will be referred to herein as the first position or full open position. In this position, the valve element 52 puts the first passage 30 in communication with the second passage 40 and allows material from the plasticizer barrel to flow directly from the barrel 10 to the mold (not shown). In FIG. 2 the valve element 52 is shown in what will be referred to as its second position or closed position.

Also depicted in FIG. 1 is an actuator 86 comprising a cylinder-and-piston motor (not shown in FIG. 1), preferably a hydraulic motor. The actuator 86 has a cylinder 88 which contains a piston 90. Piston 90 is connected to a lower piston rod 94. Piston rod 94 is connected directly with the piston 50 in the pressure cylinder 46. Working fluid for the cylinder 88 is supplied to opposite ends of the cylinder through tubing (not shown in FIG. 1) 96 from a controller (not shown in FIG. 1).

A cycle begins with the valve elements 52 in the position shown in FIG. 1. The screw 12 operating as a ram is pushed to the left by a piston (not shown) and the hot material is forced through the first passage 30, through the valve element 52, second passage 40 and mold runner 42 into a mold (not shown). The screw 12 continues to move to the left and fills the mold. When the mold 32 is full, a motor (not shown) moves the valve element 52 from its first position to its second position as shown in FIG. 2.

The passage 30 is now shut-off and the cylinder 46 and third passage 44 are in communication with the second passage 40 and the mold 32 through the valve element 52.

In FIG. 3, one embodiment of the present invention is depicted wherein element 52 is maintained between the first position (shown in FIG. 1) and the second position (shown in FIG. 2), so as to restrict the flow through element 52, since the cross-sectional area through the opening in element 52 is less in the position shown in FIG. 3, than in the position shown in FIG. 1. The restricted flow described above allows for a slower filling of the mold.

In FIG. 4, a valve operator, i.e. motor, 60 is shown which has a collar 72, connecting to valve element 52 via coupler 50 in order to rotate element 52 through its various positions. A stop 202 having screw adjuster 204 is connected to coupler 56. The stop 202 serves to position element 52 between a full open and a full closed position. The position of stop 202 is adjusted by screw 204 so as to adjust the position of valve element 52 at any desired position between the full open and closed positions. Stop 202 and adjuster 204 do not form parts of the apparatus depicted in FIG. 1.

In operation, when the motor is in its off position, element 52 is in its closed position (see FIG. 2). When the motor 60 rotates 90° clockwise, the valve element moves into its full open position (see position in FIG. 1). When the motor rotates clockwise another 90° the element 52 is once again in its closed position. A further clockwise rotation of the motor will engage stop 202 against step 206 at the desired angle as adjusted by step 204 to create a partial open position for element 52.

Figure 5:
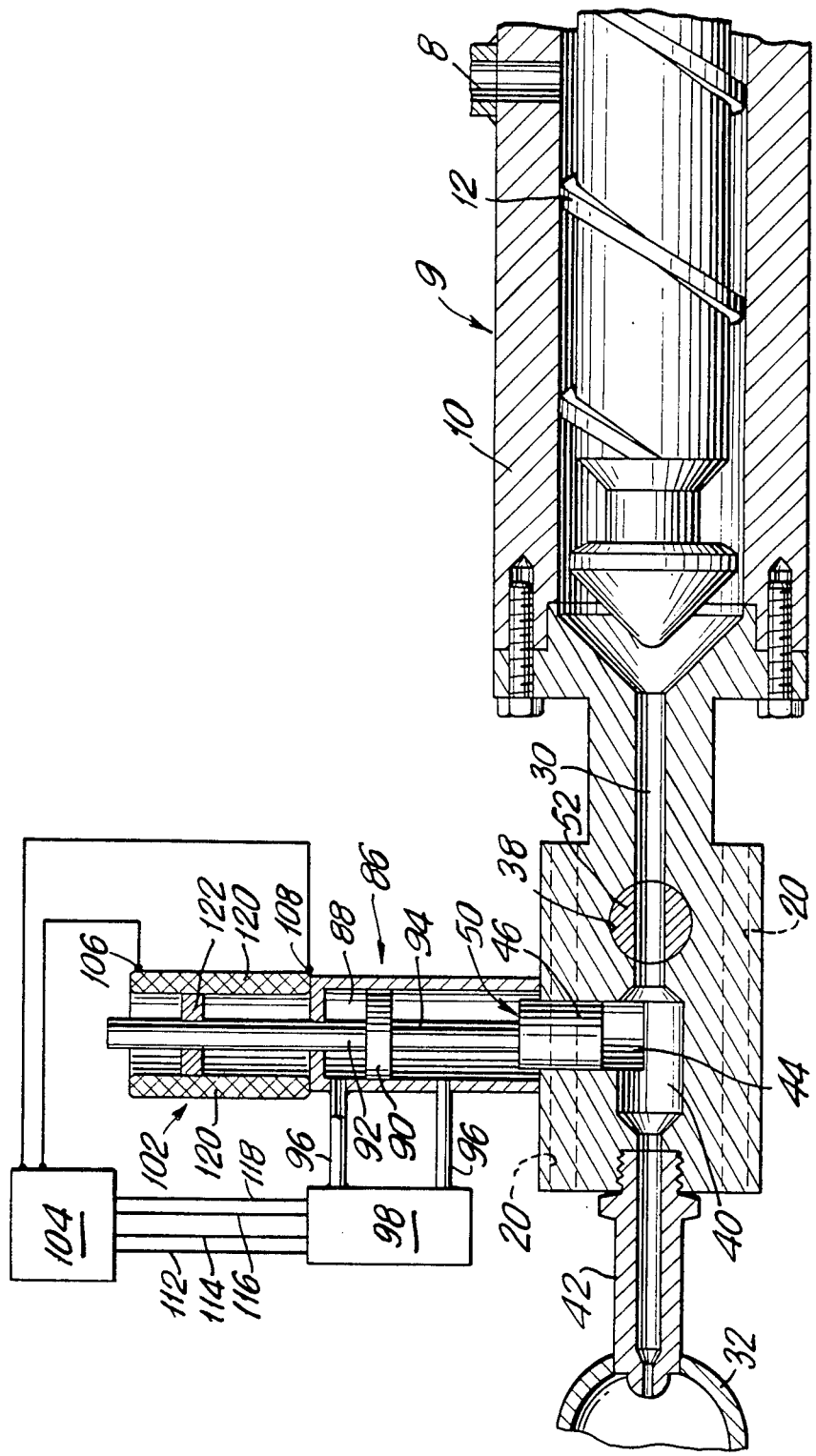
FIG. 5 is an elevational view in cross-section depicting an injection molding apparatus in accordance with the present invention.

In FIG. 5, another embodiment of the present invention is depicted. Lower piston 94 is connected to the end of lower piston 90. Upper piston rod 92 is connected to the upper end of piston 90. A positioner 122 is attached to upper piston rod 92 and is disposed above piston 90. A servo-valve 98 is connected to cylinder 88 via tubes 96 which serve to supply working fluid to cylinder 88. Disposed above cylinder 88 is a linear position potentiometer 102. Positioner 122 is, for example, a wire mesh that rubs up against exposed metal surfaces of legs 120 of potentiometer 102. A comparator system 104 is electrically connected to the upper end of the potentiometer 102 at point 106 and is electrically connected to the lower end of the potentiometer 102 at point 108. The comparator system 104 is connected to the servo-valve 98 by electrical lines 112, 114, 116 and 118.

Figure 6:
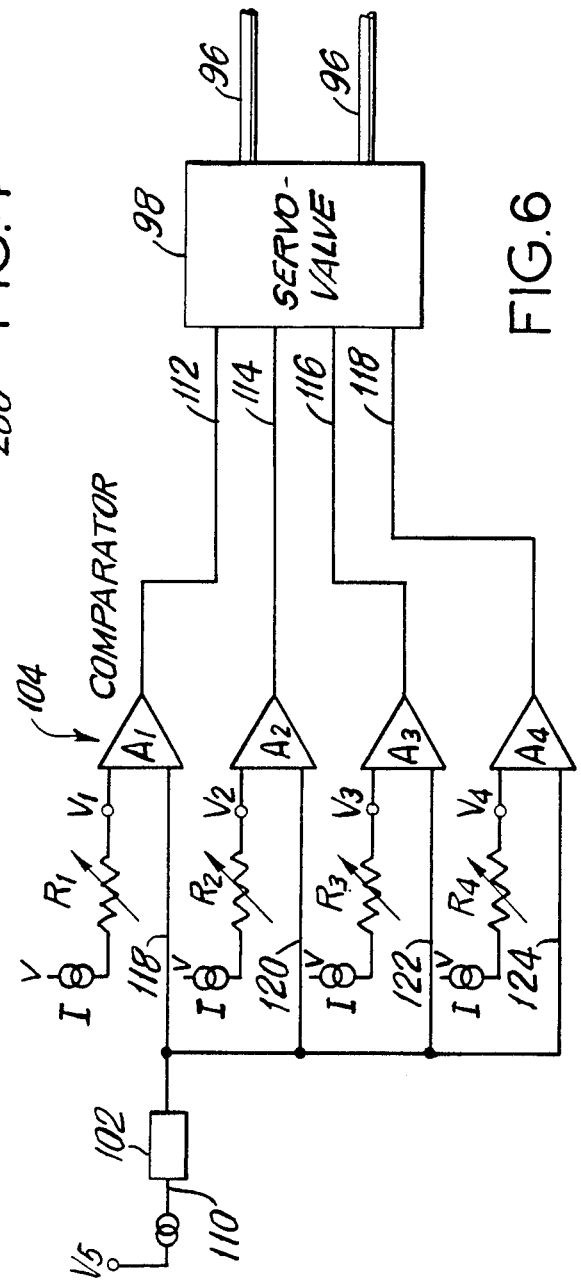
FIG. 6 is an electrical diagram depicting the comparator system depicted in FIG. 5.

In FIG. 6, the electrical circuit for the comparator system 104 is depicted. Voltage $V_5$ is supplied to the linear position potentiometer 102 at connection 110. Constant current I is passed through four variable resistors for $R_1$, $R_2$, $R_3$, $R_4$, i.e., decade resistors. Each variable resistor is electrically connected to an operational amplifier configured as a comparator, respectively $A_1$, $A_2$, $A_3$ and $A_4$ via lines 112, 114, 116 and 118, respectively.

The resistors $R_1$, $R_2$, $R_3$ and $R_4$ are set to desired values to correspond to desired respective pressures $P_1$, $P_2$, $P_3$ and $P_4$ in cylinder 88, so as to produce reference voltages $V_1$, $V_2$, $V_3$, $V_4$, respectively. The same current I, passing through potentionmeter 102 will produce a varying voltage which will actuate comparators $A_1$–$A_4$ upon reaching voltages $V_1$–$V_4$ respectively.

Whereas prior draw-back valve assemblies for injection molding apparatus involved on-off operation which caused pressure spikes, the present invention provides for a smooth transition through various, e.g., four pressure levels ($P_1$, $P_2$, $P_3$ and $P_4$).

The following table describes a typical operation of pressure in cylinder 88 versus time for four variable resistors where the current is 10 mA.

|  | time | | | |
|---|---|---|---|---|
|  | $t_1$ | $t_2$ | $t_3$ | $t_4$ |
| Selected (ohms) Resistance | $R_1 = 100$ | $R_2 = 500$ | $R_3 = 700$ | $R_4 = 900$ |
| Pressure (psig) | 100 | 500 | 700 | 900 |
| Voltage (volts) | 1 | 5 | 7 | 9 |

It will be appreciated that the instant specification and claims are set forth by way of illustration and not limitation, and that various modifications and changes may be made without departing from the spirit and scope of the present invention.

What is claimed:

1. In an injection molding apparatus including a barrel for holding molten plastic material, a first passage connected at one end with said barrel for receiving hot plastic material from said barrel, a second passage communicating with an opposite end of said first passage for receiving molten with the first passage for supplying said material to a mold, a cylinder, a third passage connected at one end with said cylinder and connected at another end with said second passage, a piston in said cylinder, movable by pressure means in one direction, and movable by pressure means in another direction to exert a suction action in said cylinder, said third passage and said second passage for drawing molten material in said second passage back into said third passage and said cylinder, and a valve means in said first passage for opening and closing said first passage, the improvement which comprises means for controlling the pressure in said cylinder for at least one predetermined postion of said piston in the cylinder, comprising a positioner connected to said piston and movable in relation to said cylinder in a linear path, a linear position potentiometer disposed adjacent said linear path of said positioner, a comparator electrically connected to said potentiometer, a servo-valve electrically connected to said comparator and pneumatically connected to said cylinder, and a voltage source connected to said potentiometer and said comparator, said comparator having at least one variable resistor electrically connected at one end thereof to said voltage source and at another end thereof to an amplifier, said amplifier being electrically connected to said servo-valve.

2. An injection molding apparatus according to claim 1, wherein said comparator includes four variable resistors, each individually electrically connected to four amplifiers, each of said amplifiers individually electrically connected to said servo-valve.

* * * * *